(12) United States Patent
Kim

(10) Patent No.: US 7,027,260 B2
(45) Date of Patent: Apr. 11, 2006

(54) DISK SPACER WITH GRADUALLY DEEPENING GROOVE FORMED ONLY IN A MIDDLE PORTION OF AN OUTER CIRCUMFERENTIAL SURFACE THEREOF

(75) Inventor: Do-wan Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 10/463,424

(22) Filed: Jun. 18, 2003

(65) Prior Publication Data

US 2004/0213138 A1    Oct. 28, 2004

(30) Foreign Application Priority Data

Jun. 19, 2002    (KR) ............................... 2002-34295

(51) Int. Cl.
  *G11B 33/14* (2006.01)
  *G11B 25/04* (2006.01)
  *G11B 17/038* (2006.01)
(52) U.S. Cl. .................. 360/98.08; 360/97.03
(58) Field of Classification Search ............. 360/97.02, 360/97.03, 98.08, 99.12
See application file for complete search history.

(56) References Cited

U.S. PATENT DOCUMENTS

| | | | |
|---|---|---|---|
| 4,683,505 A | | 7/1987 | Schmidt et al. |
| 4,819,105 A | * | 4/1989 | Edwards .................. 360/98.08 |
| 4,873,594 A | * | 10/1989 | Chen ....................... 360/98.08 |
| 2003/0179492 A1 | * | 9/2003 | Kang et al. ............... 360/97.02 |

FOREIGN PATENT DOCUMENTS

| | | | |
|---|---|---|---|
| DE | 3010236 A1 | * | 9/1980 |
| JP | 57179977 A | * | 11/1982 |
| JP | 58-155519 | | 9/1983 |
| JP | 61-156580 | | 7/1986 |
| JP | 01-276479 | | 11/1989 |
| JP | 3-121577 | | 12/1991 |
| JP | 10162548 A | * | 6/1998 |
| JP | 11-297037 | | 10/1999 |
| JP | 2000-82274 | | 3/2000 |

OTHER PUBLICATIONS

JP 61-156580 is related to U.S. Patent 4,683,505 issued to Schmidt et al.
Japanese Office Action issued on Nov. 8, 2005 in Japanese Application No. 2003-157602.

* cited by examiner

*Primary Examiner*—Craig A. Renner
(74) *Attorney, Agent, or Firm*—Staas & Halsey LLP

(57) ABSTRACT

A disk spacer coupled to an outer circumference of a hub of a spindle motor in a hard disk drive to support at least one data storage disk, wherein at least one groove generating flow of air toward an outer circumference of the disk is formed at an outer circumferential surface of the spacer. The groove is formed to be deeper from an arbitrary position on the outer circumferential surface of the spacer in a direction opposite to a rotation direction of the disk, and has a blade surface extending from the deepest position to the outer circumferential surface. The blade surface is substantially perpendicular to a tangential line at the outer circumferential surface of the spacer.

11 Claims, 7 Drawing Sheets

DISK SPACER WITH GRADUALLY DEEPENING GROOVE FORMED ONLY IN A MIDDLE PORTION OF AN OUTER CIRCUMFERENTIAL SURFACE THEREOF

CROSS-REFERENCE TO RELATED APPLICATIONS

This application claims the priority of Korean Patent Application No. 2002-34295, which was filed on Jun. 19, 2002 in the Korean Intellectual Property Office, the disclosure of which is incorporated herein by reference in its entirety.

BACKGROUND OF THE INVENTION

1. Field of the Invention

The present invention relates to a disk spacer for a hard disk drive, and, more particularly, to a disk spacer for a hard disk drive having an improved shape so that vibration of a rotating disk can be reduced.

2. Description of the Related Art

Hard disk drives (HDDs) are one of many types of auxiliary memory devices of a computer which read data stored on a magnetic disk or record data on the magnetic disk by a magnetic head. To achieve high speed, high capacity, and low vibration of a hard disk drive, a variety of research and development is being performed.

FIG. 1 is an exploded perspective view illustrating a conventional hard disk drive. FIG. 2 is a vertical sectional view of the hard disk drive of FIG. 1.

Referring to FIGS. 1 and 2, a conventional hard disk drive includes a housing 10, a spindle motor 30 installed in the housing 10 to rotate a magnetic disk (a hard disk) 20, and an actuator 40 having a magnetic head (not shown) to record and reproduce data with respect to the disk 20.

The housing 10 is installed in a main body (not shown) of a computer and includes a base plate 11 supporting the spindle motor 30 and the actuator 40, and a cover plate 12 coupled to an upper portion of the base plate 11 to encompass and protect the disk 20.

The actuator 40 can pivot around a pivot shaft 47 installed on the base plate 11 by a voice coil motor 48. The actuator 40 includes an arm 46 coupled to the pivot shaft 47 to be capable of pivoting, and a suspension 44 installed at the arm 46 and supporting a slider 42 where the magnetic head is mounted to be elastically biased toward a surface of the disk 20.

One or a plurality of disks can be installed as a recording medium (media) for recording of data to be spaced apart by a predetermined distance and rotated by the spindle motor 30.

The spindle motor 30 is supported by a flange 31 fixedly installed on the base plate 11. An upper end portion of a shaft 32 of the spindle motor 30 is typically coupled to the cover plate 12 by a screw 36 and is fixed thereto. A bearing 37 is provided at the outer circumference of the shaft 32 so that a hub 33 can rotate. The disk 20 is inserted around the outer circumference of the hub 33. When a plurality of disks are installed, a ring type spacer 50 is installed around the outer circumference of the hub 33 to maintain a gap between the disks. A clamp 60 to prevent escape of the disk 20 is coupled to an upper end portion of the hub 33. Although the spacer 50 is typically used to maintain a gap between the disks, when only a single disk is installed, the spacer 50 may be used to fill a space between the disk 20 and the clamp 60.

FIG. 3 is a magnified perspective view illustrating a portion of the hard disk drive. FIG. 4 is a side view illustrating a slider that is shown in FIG. 3.

Referring to FIG. 3, a parking zone 21, where the slider 42 of the actuator 40 is parked when power is turned off, is provided at the inner circumferential side of the disk 20. A data zone 22, where magnetic signals are recorded, is provided outside the parking zone 21. In the data zone 22, servo signals indicating position of information to be recorded are recorded in advance on several tens of thousands of tracks formed along the circumference of the disk 20.

While the power of the hard disk drive is being turned off, the slider 42 is parked in the parking zone 21 of the disk 20 by an elastic force of the suspension 44. When the power is turned on and the disk 20 begins to rotate, lift is generated by air pressure and accordingly the slider 42 is lifted. The slider 42 in a lifted state is moved toward the data zone 22 of the disk 20 as the actuator 40 pivots. The slider 42 moved into the data zone 22 maintains a lifted state, as shown in FIG. 4, at a height where the lift by the rotation of the disk 20 and the elastic force of the suspension 44 are balanced. A magnetic head 41 mounted on the slider 42 maintains a predetermined distance from the disk 20 that is rotating and performs recording and reproduction of data.

However, in the conventional hard disk drive having the above structure, fluttering is generated in the disk 20 that is rotating by a variety of factors, in particular, by irregular movements of air inside the hard disk drive. FIG. 5 shows the flow of air formed around the disk 20 in a conventional hard disk drive which is commonly known. As shown in the drawing, the flow of air at the central portion of the disk 20 has the same direction (arrow B) as the rotation direction of the disk 20 (arrow A). A plurality of torrents (arrow C) are formed at the outer circumferential side of the disk 20. The torrents deter smooth flow of air around the disk 20. Accordingly, a local difference in temperature exists at the outer circumferential side of the disk 20. That is, the temperature of air at the portion where the torrents are generated is higher than at the other portions because the flow of air is not smooth. Such a deviation of temperature at the outer circumferential side of the disk 20 causes deviation in air pressure. As a result, the air pressure applied to the outer circumferential side of the disk 20 differs locally so that fluttering is generated in the disk 20.

In the disk fluttering, there is an RRO (repeatable runout), a component that is repeated at each rotation, and an NRRO (non-repeatable runout), a component that is not repeated. Since RRO is regularly repeated, it can be compensated by a servo control system. However, it is difficult to compensate NRRO because it cannot be anticipated in advance. The disk fluttering increases a PES (position error signal) so that data recording and reproduction capability of the magnetic head 41 is lowered. Thus, performance of a hard disk drive is deteriorated.

In particular, as the rotation speed of the disk 20 increases and the thickness of the disk 20 decreases, the disk fluttering increases further so that accurate data recording or reproduction is difficult with only the servo control system. Furthermore, as TPI (track per inch) increases, the disk fluttering makes accurate position control of the magnetic head 41 more difficult.

In light of the above, to secure reliability of performance of a hard disk drive, the disk fluttering generated during the operation needs to be lowered. Furthermore, with the recent trends toward high speed, high capacity, and low noise, lowering the disk fluttering is one of the most imminent issues to be solved.

SUMMARY OF THE INVENTION

It is an aspect of the present invention to provide a disk spacer of a hard disk drive having a groove formed on an outer circumferential surface thereof to generate the flow of air toward the outer circumference of a disk so that the flow of air around the disk becomes smooth and the disk fluttering is lowered.

Additional aspects and/or advantages f the present invention will be set forth in part in the description that follows, and, in part, will be obvious from the description, or may be learned by practicing the present invention.

The foregoing aspects and/or advantages of the present invention are achieved by providing a disk spacer coupled to an outer circumference of a hub of a spindle motor in a hard disk drive to support at least one data storage disk, wherein at least one groove generating flow of air toward an outer circumference of the disk is formed at an outer circumferential surface of the spacer.

In an embodiment, the at least one groove is formed to be deeper from an arbitrary position on the outer circumferential surface of the spacer in a direction opposite to a rotation direction of the disk spacer in a direction opposite to a rotation direction of the at least one data storage disk, and has a blade surface extending from the deepest position to the outer circumferential surface.

In an embodiment, the blade surface is substantially perpendicular to a tangential line at the outer circumferential surface of the disk spacer.

In an embodiment, the at least one groove is formed throughout an entire outer circumferential surface in a vertical direction of the disk spacer or in the middle portion of the outer circumferential surface of the disk spacer in a vertical direction.

In an embodiment, only one groove is formed at the outer circumferential surface of the disk spacer, or a plurality of grooves are formed along the outer circumferential surface of the disk spacer at a predetermined interval.

BRIEF DESCRIPTION OF THE DRAWINGS

These and/or other aspects and/or advantages of the present invention will become apparent and more readily appreciated by describing in detail preferred embodiments thereof with reference to the attached drawings of which.

DETAILED DESCRIPTION OF THE PREFERRED EMBODIMENTS

Figure 1:
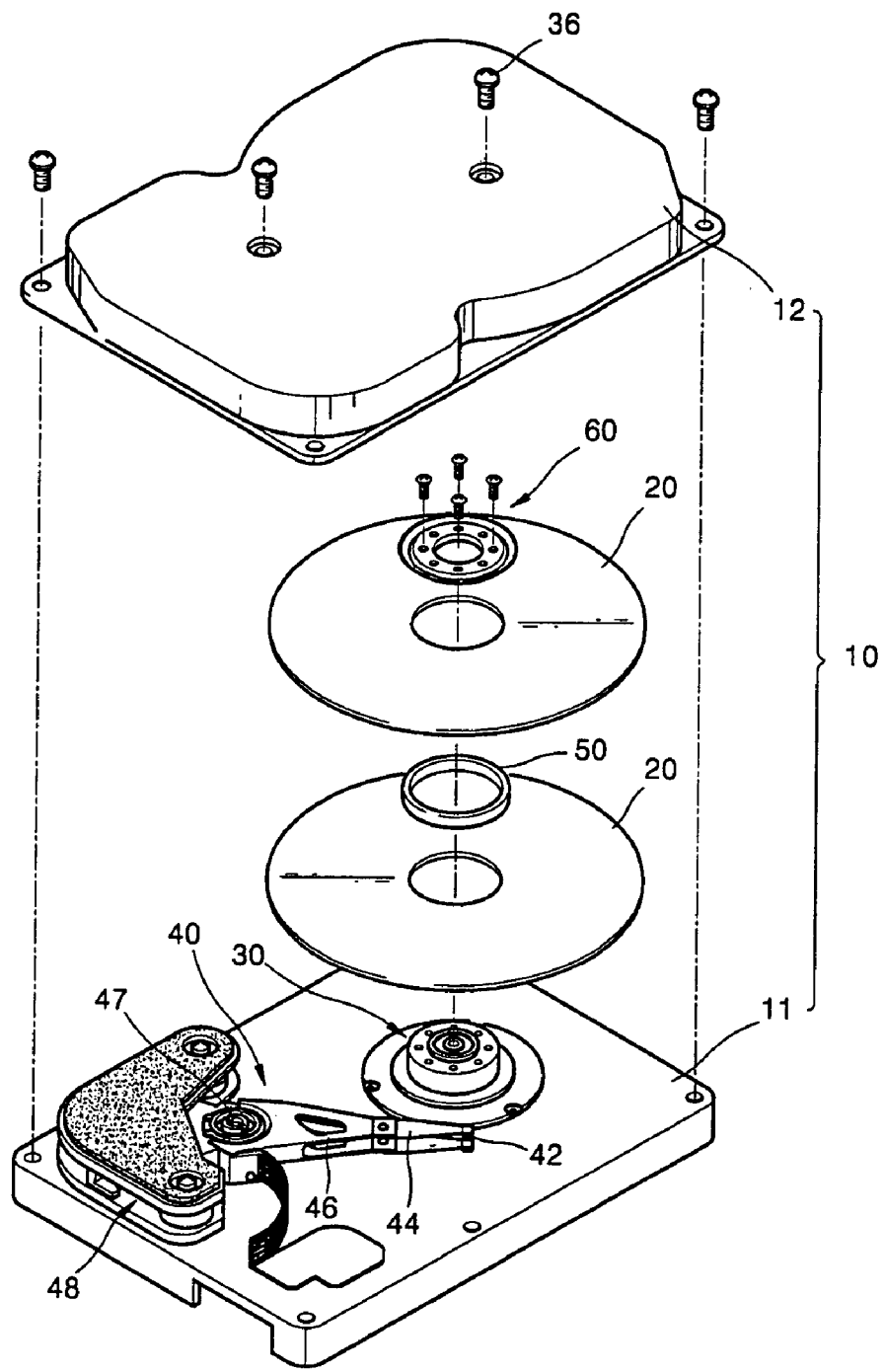
FIG. 1 is an exploded perspective view illustrating a conventional hard disk drive.
Figure 2:
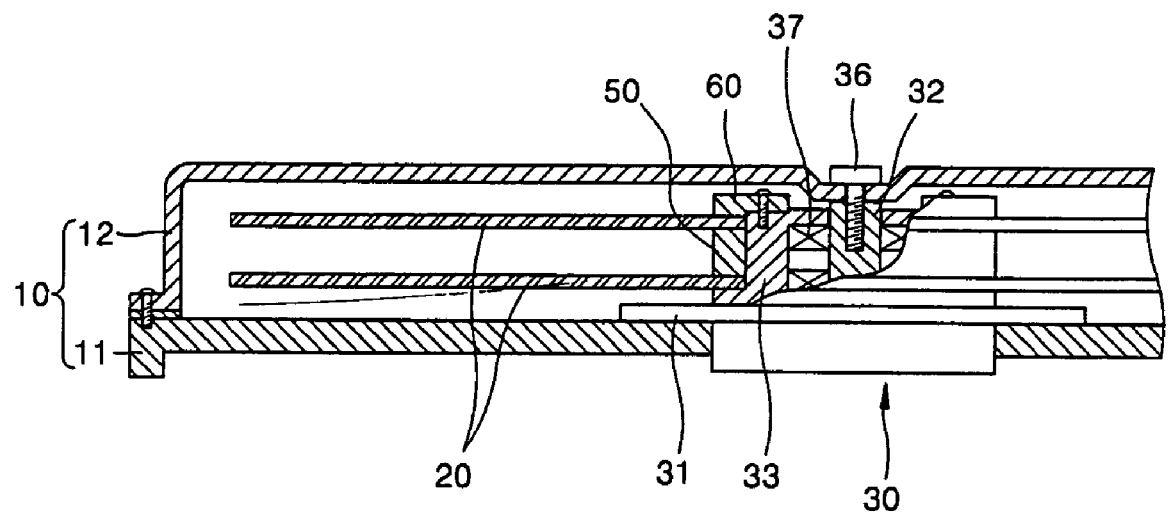
FIG. 2 is a vertical sectional view illustrating the hard disc drive of FIG. 1.
Figure 3:
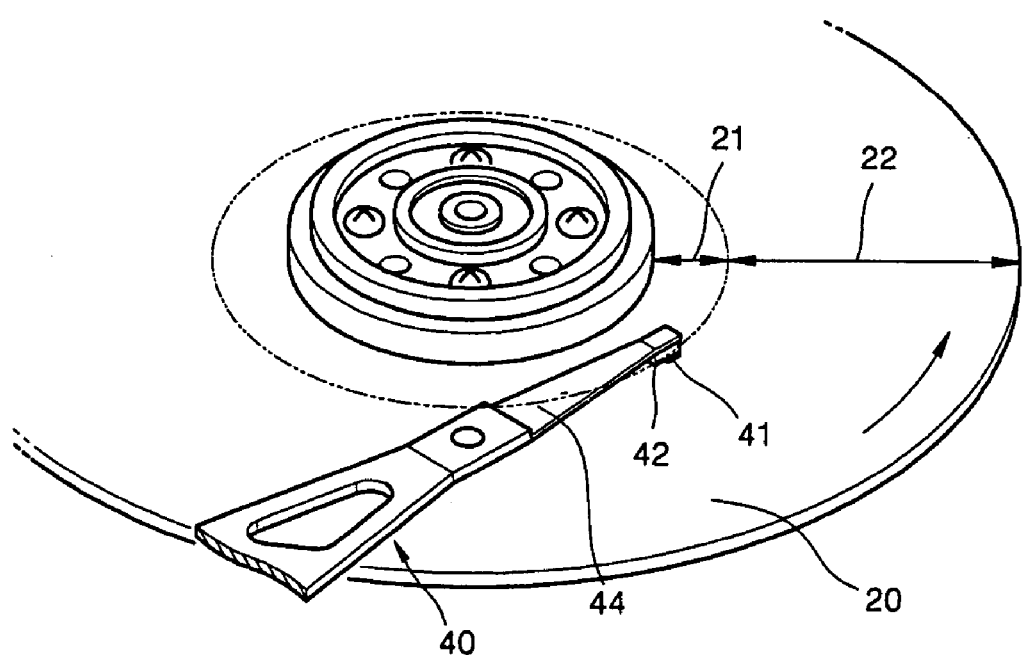
FIG. 3 is a magnified perspective view illustrating a part of the hard disk drive of FIG. 1.
Figure 4:
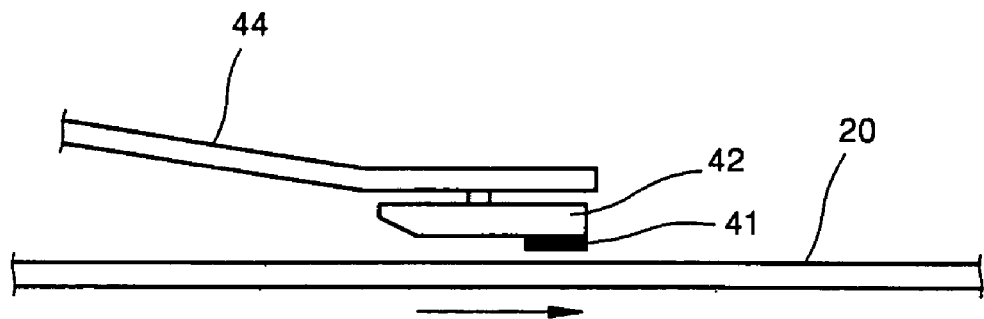
FIG. 4 is a side view illustrating a part of a slider portion shown in FIG. 3.

Reference will no be made in detail to the embodiments of the present invention, examples of which are illustrated in the accompanying drawings, wherein like reference numerals refer to like elements throughout.

Figure 6:
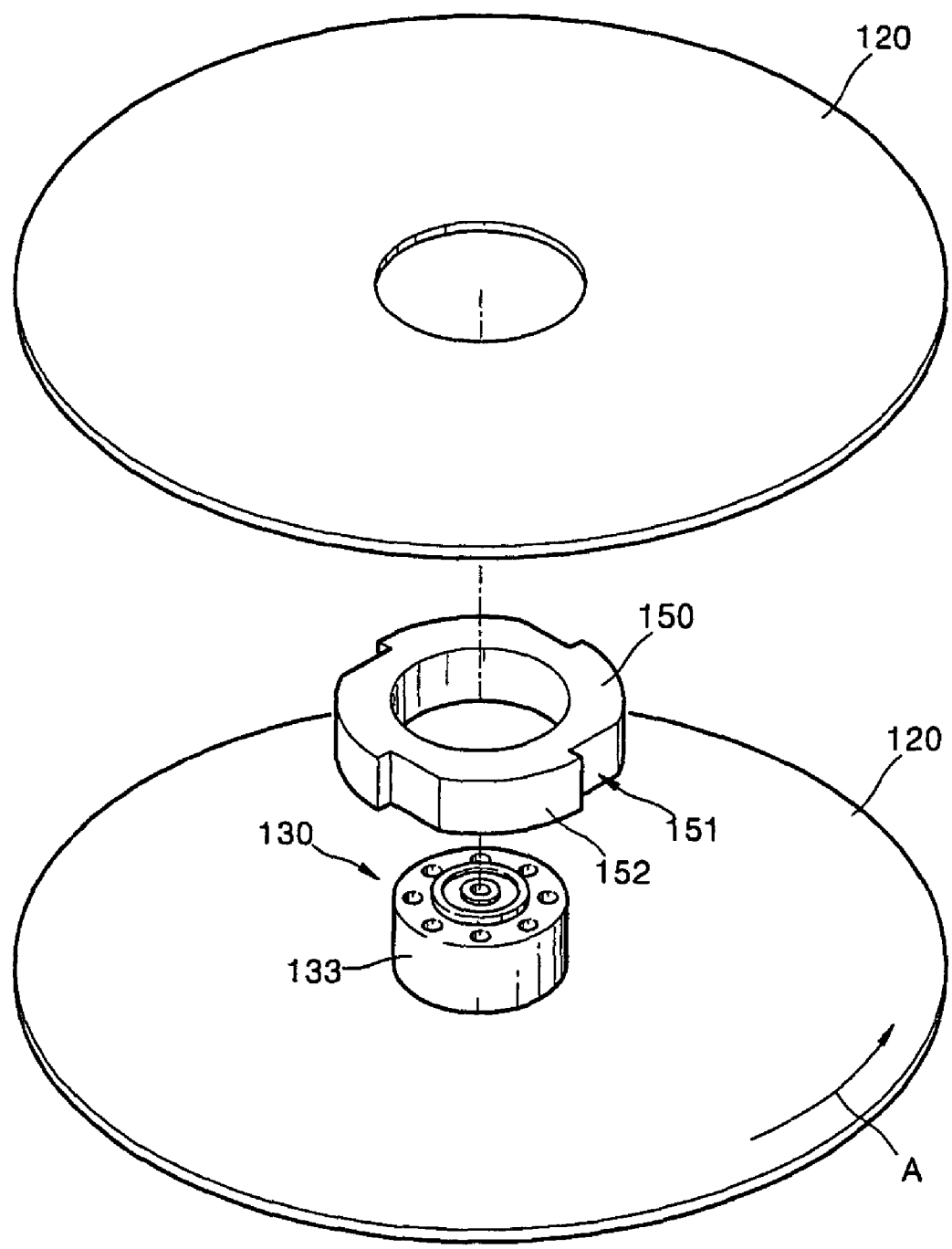
FIG. 6 is a perspective view illustrating a disk spacer of a hard disk drive according to the first embodiment of the present invention.
Figure 7:
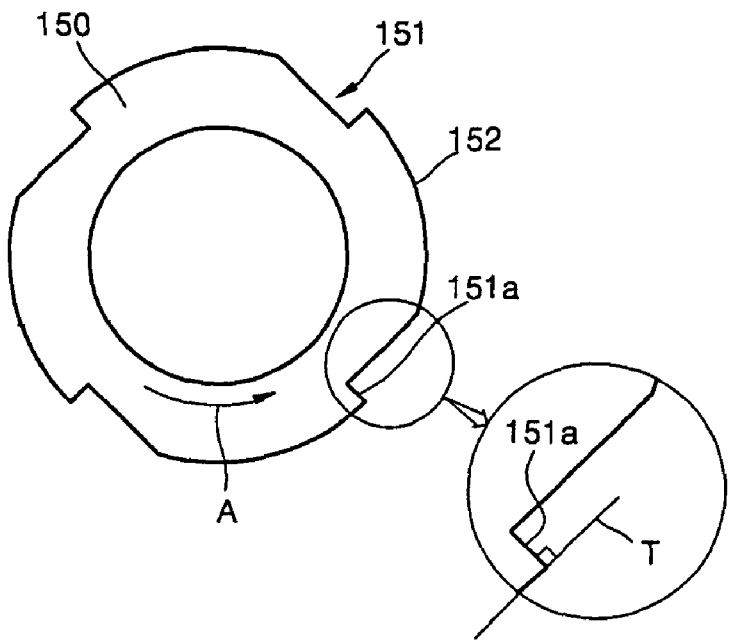
FIG. 7 is a magnified plan view of the disk spacer shown in FIG. 6.

Referring to FIGS. 6 and 7, one or a plurality of disks 120 are installed at the outer circumference of a hub 133 of a spindle motor 130 in a hard disk drive. Recently, as a surface recording density of a disk sharply increases, only one or two disks are usually sufficient to store a sufficient amount of data. Thus, hard disk drives having one or two disks are widely used. Accordingly, the present invention will be described based on a hard disk drive having two disks 120. However, the present invention is not limited to a case in which two disks are provided, as the present invention may be applied to the cases in which a hard disk drive has one disk or three or more disks.

A disk spacer 150 according to the present invention is used to support the disk 120 at the outer circumference of the hub 133 of the spindle motor 130 in the hard disk drive. When two or more disks 120 are installed, the disk spacer 150 has a function of maintaining an interval between the disks 120. When a single disk 120 is installed, the disk spacer 150 can be used to fill a space between the disk 120 and the clamp (refer to FIG. 1).

The disk spacer 150 has at least one groove 151 formed in an outer circumferential surface 152 of the disk spacer 150. The groove 151 generates flow of air in a direction toward the outer circumference of the disk 120 as the disk 120 and the spacer 150 rotate.

Figure 8:
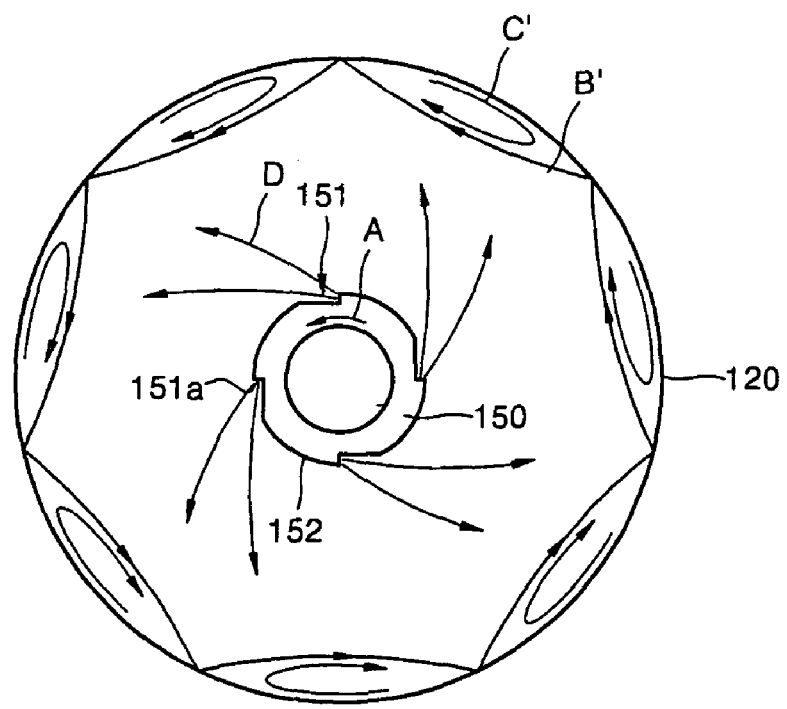
FIG. 8 is a plan view illustrating the flow of air formed around the disk in a hard disk drive adopting the disk spacer according to the present invention.

In an embodiment, the disk spacer 150 has a ring shape. In an embodiment, a single or a plurality of the grooves 151 can be formed at the outer circumferential surface 152 of the spacer 150 at an identical interval. In an embodiment, the groove 151 is formed to be gradually deeper from an arbitrary position at the outer circumferential surface 152 of the spacer 150 in a direction opposite to the rotation direction of the disk (direction A). In an embodiment, the groove 151 can be formed entirely in a vertical direction from the lower surface to the upper surface of the spacer 150. In an embodiment, the groove 151 has a blade surface 151a extending from the deepest portion of the groove 151 to the outer circumferential surface 152 of the spacer 150. In an embodiment, the blade surface 151a is perpendicular to a tangential line T of the outer circumferential surface 152 of the spacer 150. The blade surface 151a pushes air close to the outer circumferential surface 152 of the spacer 150 as the disk 120 and the spacer 150 rotate, as shown in FIG. 8. Accordingly, the flow of air directing the outer circumference of the disk 120 is formed as indicated by arrow D.

Figure 5:
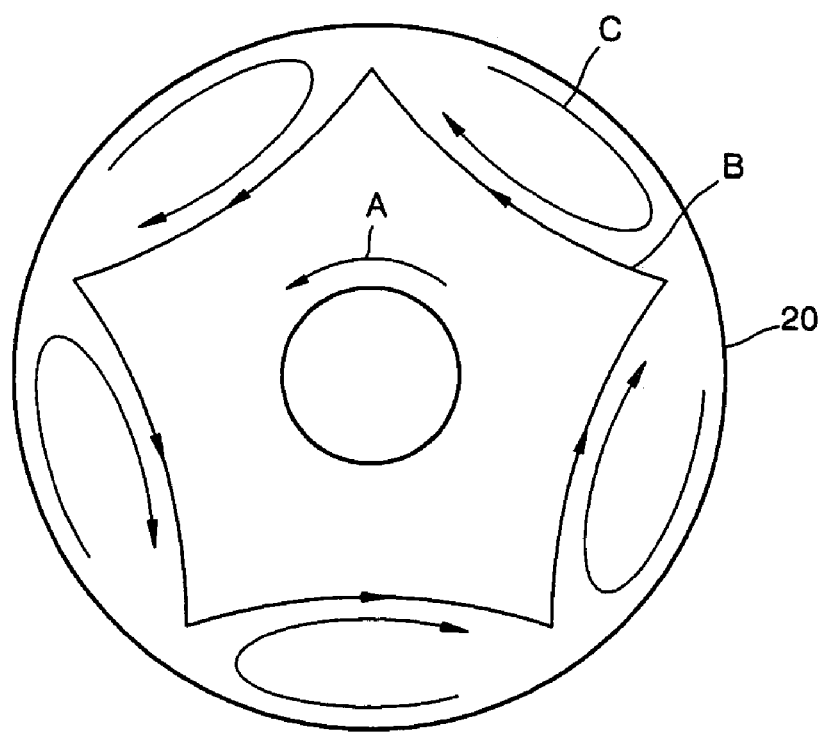
FIG. 5 is a plan view illustrating the flow of air formed around the disc in the conventional hard disk drive.

The flow of air (arrow D) formed by the groove 151 having the blade surface 151a and directing the outer circumference of the disk 120 extends the radius of the flow of air (arrow B') in the same direction as the rotation direction of the disk 120 and form the flow of air to be more circular, compared with the conventional technology shown in FIG. 5. On the contrary, the size of torrents (arrow C') formed at the outer circumference of the disk 120 is reduced. Thus, air circulates more smoothly around the disk 120 so that deviation in local temperature at the outer circumferential area of the disk 120 is reduced. As a result, disk fluttering by the deviation in air pressure applied to the outer circumferential area of the disk 120 can be reduced. The reduction of disk fluttering reduces PES and accordingly data recording/reproducing performance of the magnetic head and reliability thereof are improved.

Figure 9:
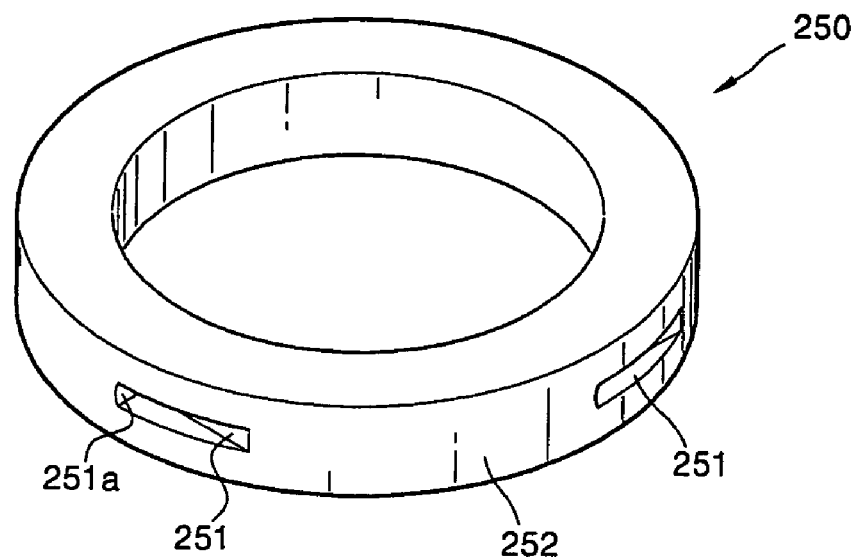
FIG. 9 is a perspective view illustrating a disk drive of a hard disk drive according to the second embodiment of the present invention.
Figure 10:
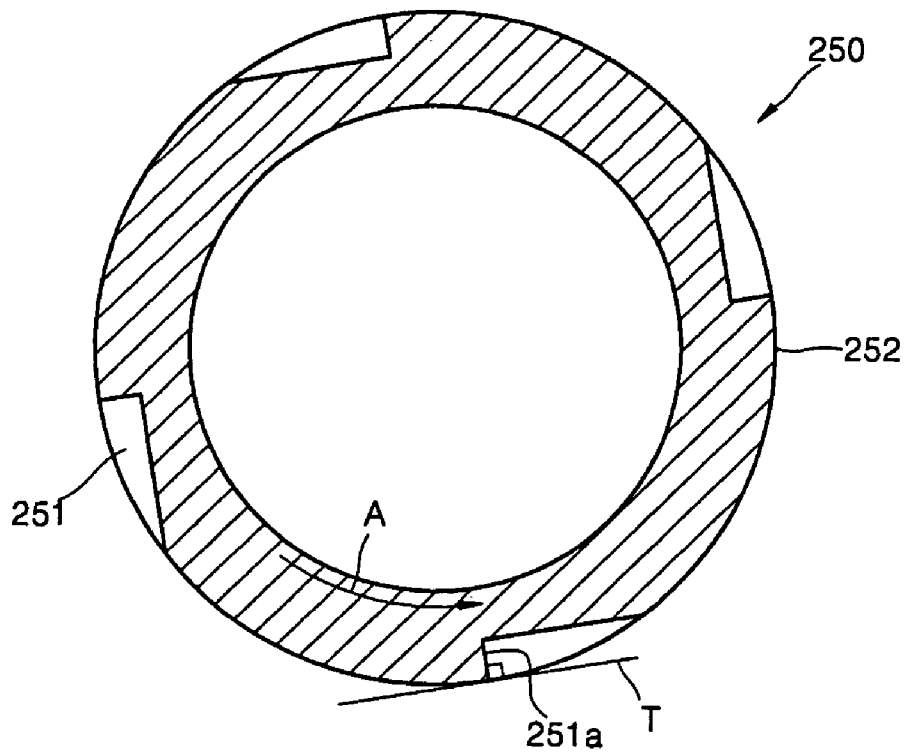
FIG. 10 is a horizontal sectional view of the disk spacer shown in FIG. 9.

Referring to FIGS. 9 and 10, a disk spacer 250 according to the second embodiment of the present invention includes at least one groove 251 generating flow of air toward the outer circumference of the disk. A single or a plurality of the grooves 251 can be formed at the outer circumferential surface 252 of the spacer 250 at an identical interval. The groove 251 is formed to be gradually deeper from an arbitrary position at the outer circumferential surface 252 of the spacer 250 in a direction opposite to the rotation direction of the disk (direction A). The groove 251 has a blade surface 251a extending from the deepest portion of the groove 251 to the outer circumferential surface 252 of the spacer 250. The blade surface 251a is preferably perpendicular to a tangential line T of the outer circumferential surface 252 of the spacer 250.

Thus, because the spacer 250 having the above structure according to the second embodiment of the present invention has the same operation as that of the spacer 150 according to the first embodiment of the present invention, a detailed description thereof will be omitted.

Figure 11:
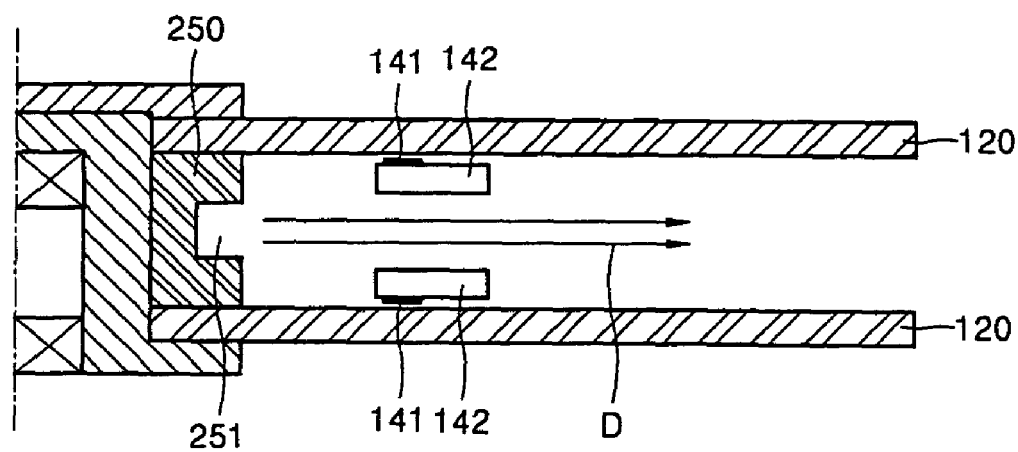
FIG. 11 is a side view illustrating the flow of air between two disks in a hard disk drive in which the disk spacer shown in FIG. 9 is installed.

Unlike the first embodiment, the groove 251 according to the second embodiment of the present invention is formed in the middle portion of the outer circumferential surface 252 of the spacer 250 in the vertical direction. Thus, as shown in FIG. 11, because the flow of air D toward the outer circumference of the disk 120 which is generated by the groove 251 of the spacer 250 is formed separated a predetermined distance from the surface of the disk 120, the flow of air D hardly has any direct effect on the slider 142 close to the surface of the disk 120 and the magnetic head 141 mounted on the slider 142. That is, the data recording reproduction operation by the magnetic head 141 is not hindered by the flow of air D generated by the groove 251.

Because the groove 251 is formed in the middle portion in a vertical direction of the outer circumferential surface 252 of the spacer 250 according to the second embodiment of the present invention, the upper and lower surfaces of the spacer 250 contacting the disk 120 are completely circular like the conventional spacer 50 (refer to FIG. 1). That is, according to the second embodiment of the present invention, a contact area between the space 250 and the disk 120 is the same as that in the hard disk drive adopting the conventional spacer. Thus, because the hard disk drive adopting the spacer 250 according to the second embodiment of the present invention can have the same frequency system as that of the conventional hard disk drive, other constituent components do not need to be modified to prevent resonance between the constituent components in the hard disk drive.

On the contrary, as shown in FIG. 6, when the spacer 150 according to the first embodiment of the present invention is used, because the groove 151 is formed throughout the vertical direction of the outer circumferential surface 152, the contact area between the disk 120 and the spacer 150 is reduced compared to the conventional technology. Hence, according to the first embodiment of the present invention, although the groove 151 is easy to be processed in the outer circumferential surface 152 of the spacer 150 and generates the flow of air toward the outer circumference of the disk 120, the contact area between the disk 120 and the spacer 150 is reduced so that frequencies of the spindle motor 130 and the disk 120 are much altered from those in the conventional hard disk drive. In this case, because a rocking frequency of the spindle motor 130 is changed, other constituent components must be modified to avoid resonance with the constituent components.

The effect of reduction of disk fluttering in a hard disk drive adopting the disk spacer according to the present invention will be described in comparison with the conventional hard disk drive.

Figure 12:
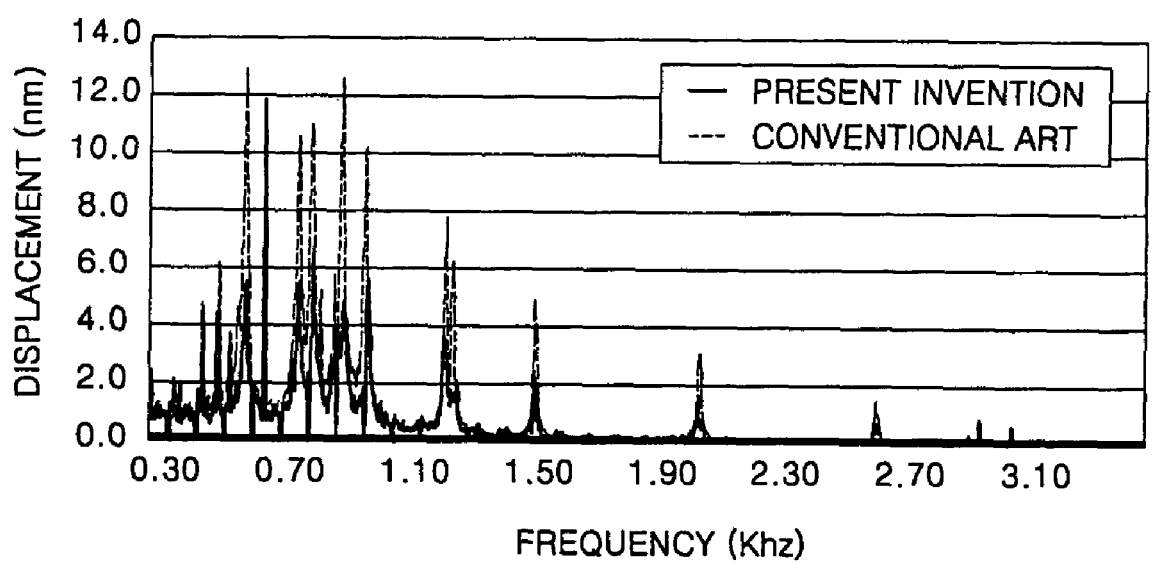
FIG. 12 is a graph showing that disk fluttering is reduced by the disk spacer according to the second embodiment of the present invention shown in FIG. 9.

FIG. 12 shows the reduction of disk fluttering by the disk spacer according to the second embodiment of the present invention. The graph shows the result of measurement of displacement of disk fluttering according to frequency in a hard disk drive adopting a disk spacer having a single groove.

Referring to FIG. 12, it can be seen that the displacement of disk fluttering according to f in a hard disk drive adopting a disk spacer according to the present invention is much lower than that in the conventional hard disk drive.

Table 1 below shows the amount of reduction of disk fluttering by the disk spacer according to various embodiments of the present invention as compared to the conventional technology. The figures indicated in Table 1 are values obtained by integrating an NPRO component between 300 Hz–3200 Hz. A smaller value indicates a greater effect in reduction of disk fluttering.

TABLE 1

| Test No. | Conventional HDD | First Embodiment Two Grooves | Second Embodiment | | | |
|---|---|---|---|---|---|---|
| | | | One Groove | Two Grooves | Four Grooves | Five Grooves |
| 1 | 40.325 | 38.281 | 36.300 | 37.080 | 37.444 | 39.714 |
| 2 | 40.697 | 37.710 | 36.410 | 36.264 | 37.894 | 39.673 |
| 3 | 39.803 | 38.129 | 36.126 | 36.626 | 36.995 | 40.251 |
| 4 | 40.669 | 37.620 | 36.204 | 36.038 | 37.527 | 39.584 |
| 5 | 39.917 | 38.259 | 35.997 | 36.600 | 38.591 | 39.357 |
| 6 | 40.913 | 37.562 | 34.663 | 36.691 | 37.207 | 38.439 |
| 7 | | | 34.929 | | | 38.387 |
| Average | 40.387 | 37.927 | 35.804 | 36.550 | 36.610 | 39.344 |
| Rate of Reduction of Disk Fluttering | | 6.09% | 11.35% | 9.50% | 6.88% | 2.58% |

In Table 1, it can be seen that the hard disk drive adopting a spacer according to the present invention has an effect of reducing disk fluttering by 11.35% at its maximum compared to the hard disk drive adopting a conventional spacer. In particular, the spacer according to the second embodiment has a superior disk fluttering reduction effect than the spacer according to the first embodiment of the present invention. Also, a spacer having a single groove has a superior disk fluttering reduction effect than a spacer having two or more grooves.

As a result, it can be seen from the above tests that a spacer having a single groove having a shape according to the second embodiment is the best suitable shape exhibiting a superior disk fluttering reduction effect.

As described above, according to the disk spacer of a hard disk drive according to the present invention, the flow of air toward the outer circumference of the disk is formed by the grove formed at the outer circumferential surface of the spacer. The flow of air around the disk is made smooth so that the disk fluttering is reduced. Also, the data recording/reproducing performance by the magnetic head such as reduction of PES, and the reliability thereof, are improved.

While embodiments of the present invention have been particularly shown and described, it will be understood by those skilled in the art that various changes in form and details may be made therein without departing from the spirit and scope of the invention as defined by the appended claims.

What is claimed is:

1. A hard disk drive disk spacer, wherein the disk spacer has a ring shape, comprising:
    an outer circumferential surface; and
    at least one groove formed in the outer circumferential surface to generate a flow of air in a direction toward an outer circumference of a hard disk when the disk spacer rotates,
    wherein the at least one groove is gradually deeper from an arbitrary position on the outer circumferential surface in a direction opposite to a rotation of the disk spacer, and
    wherein the at least one groove is formed in a vertical direction only in a middle portion of the outer circumferential surface.

2. The disk spacer of claim 1, wherein when there are a plurality of grooves, each of the plurality of grooves are formed at an identical interval around the outer circumferential surface.

3. The disk spacer of claim 1, wherein the at least one groove includes a blade surface that extends from a deepest portion of the at least one groove to the outer circumferential surface.

4. The disk spacer of claim 3, wherein the blade surface is perpendicular to a tangential line of the outer circumferential surface.

5. The disk spacer of claim 3, wherein the blade surface pushes air that is close to the outer circumferential surface as the disk spacer rotates.

6. The disk spacer of claim 1, wherein an upper surface and a lower surface of the outer circumferential surface are completely circular.

7. A hard disk drive having a spindle motor with a hub, comprising:
    a disk spacer coupled to an outer circumference of the hub of the spindle motor in the hard disk drive to support at least one data storage disk, wherein
    at least one groove generating flow of air toward an outer circumference of the at least one data storage disk is formed at an outer circumferential surface of the disk spacer,
    the at least one groove is formed to be gradually deeper from an arbitrary position on the outer circumferential surface of the disk spacer in a direction opposite to a rotation direction of the at least one data storage disk, and
    the at least one groove is formed only in the middle portion of the outer circumferential surface of the disk spacer in a vertical direction.

8. The hard disk drive of claim 7, wherein the at least one groove has a blade surface extending from the deepest position to the outer circumferential surface.

9. The hard disk drive of claim 8, wherein the blade surface is substantially perpendicular to a tangential line at the outer circumferential surface of the disk spacer.

10. The hard disk drive of claim 7, wherein only one groove is formed at the outer circumferential surface of the disk spacer.

11. The hard disk drive of claim 7, wherein a plurality of grooves are formed along the outer circumferential surface of the disk spacer at a predetermined interval.

* * * * *